Jan. 1, 1952  V. C. PATTERSON  2,581,330
REFRIGERATION CONTROL APPARATUS
Filed Dec. 27, 1947  2 SHEETS—SHEET 1

Inventor
VELT C. PATTERSON
By
ATTORNEY,

Jan. 1, 1952  V. C. PATTERSON  2,581,330
REFRIGERATION CONTROL APPARATUS
Filed Dec. 27, 1947  2 SHEETS—SHEET 2
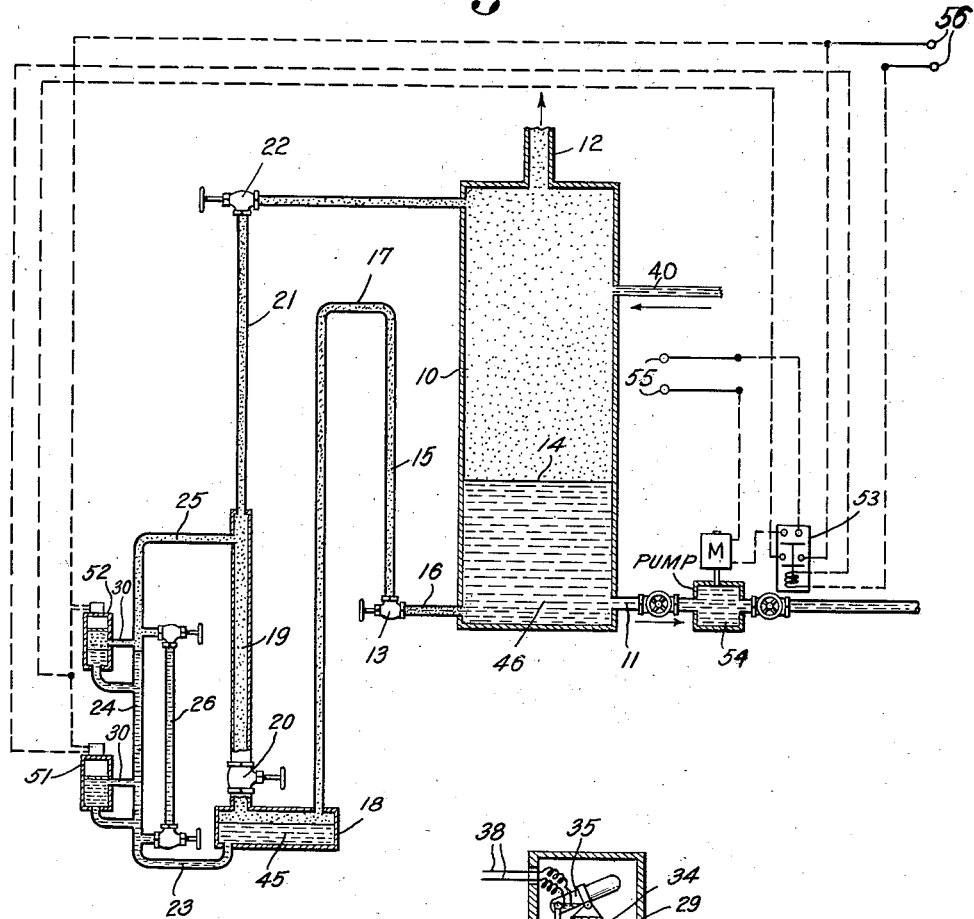
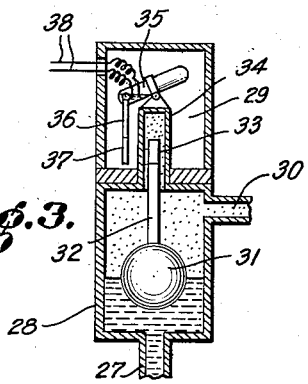
Inventor
VELT C. PATTERSON
ATTORNEY.

Patented Jan. 1, 1952

2,581,330

UNITED STATES PATENT OFFICE 2,581,330

REFRIGERATION CONTROL APPARATUS

Velt Cowan Patterson, York, Pa., assignor to V. C. Patterson & Associates, Inc., York, Pa., a corporation of Pennsylvania Application December 27, 1947, Serial No. 794,179

1 Claim. (Cl. 62—8)

This invention relates to the art of refrigeration, and more particularly to automatic control apparatus therefor.

In refrigeration systems utilizing a vaporizable low-temperature-liquid refrigerant, such as liquid ammonia, it is often necessary to maintain a definite level of the liquid in a tank, trap or receiver containing both liquid and gaseous refrigerant. It is also desirable to provide an indicator for showing visually the level of the liquid refrigerant in the tank. Liquid refrigerants, such as ammonia, are generally at relatively low temperatures when stored in tanks or receivers, and the low temperature leads to an accumulation of frost both on the tank and on such control devices and level indicators as have been used in the past. Low temperatures and frosting often causes the control devices to freeze and become inoperative, and the frosting or icing may render the level indicator unreliable or not readable. It has been proposed to insulate the controls and indicators, or to apply heat thereto, to prevent frosting and freezing, but such procedures have often been found inefficient and uneconomical.

It is an object of this invention to provide improved apparatus for automatically controlling and indicating the liquid level of vaporizable low-temperature refrigerants in tanks and receivers.

It is another object of this invention to provide a liquid level control system which is not affected by the low temperature of the liquid refrigerant being controlled.

It is another object of this invention to provide a level control and indicating system which does not require any heat insulation to maintain it in proper operative condition.

It is a further object of this invention to provide an improved level control and indicating system which may be economically applied to refrigerant tanks and receivers already installed in refrigerating systems.

Other objects and advantages of this invention will be readily apparent to those skilled in the refrigeration art from examination of the following description of the preferred embodiments illustrated in the accompanying drawings wherein:

Figure 2 is an elevation view, partly diagrammatic and partly in section, of a modified form of level control and indicating apparatus.

Figure 3 is an elevational view in section of a form of float switch which may be used in the apparatus of either Figure 1 or Figure 2.

Figure 1:
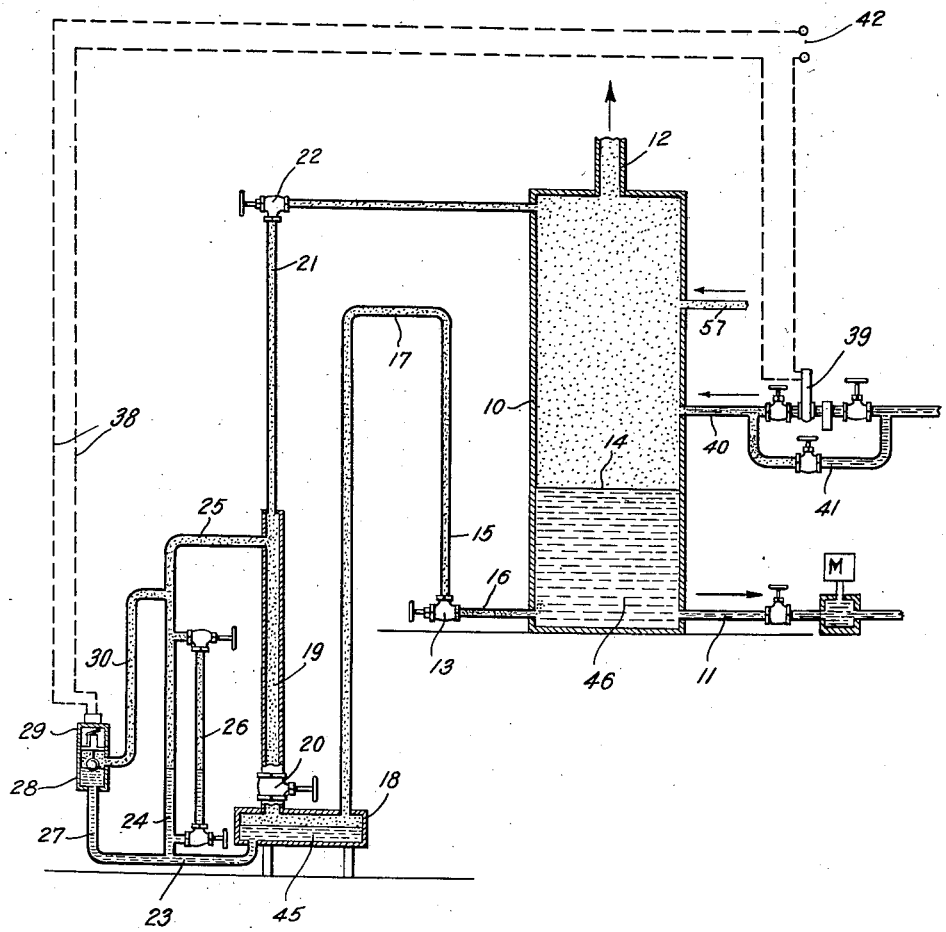
Figure 1 is an elevation view, partly diagrammatic and partly in section, of a level control and indicating system for use with tanks for storing a liquid refrigerant.

Referring now to Figure 1, for the purposes of illustration, a storage tank or receiver for liquid and gaseous refrigerant is indicated by the numeral 10. The tank 10 is provided with a liquid refrigerant inlet 40 for the admission of additional liquid refrigerant, and is provided with an outlet 11 through which liquid refrigerant may be led or pumped by the pump M to conventional cooling coils. The tank 10 is also provided with a refrigerant return connection 57 from cooling coils or the like, and is provided with an outlet 12 to conventional compressors. The level of the liquid refrigerant 46 in the tank 10 is indicated by the numeral 14, and it is generally desirable to maintain this level reasonably constant at some convenient height such as shown. The tank 10 may and should be provided with suitable heat insulation (not shown).

A pressure conduit 15 is connected to the tank 10 at a point well below the normal liquid level 14 and extends outwardly from the tank, preferably in a horizontal direction. The horizontal portion 16 of the conduit 15 is uninsulated in order that any liquid refrigerant flowing from the tank 10 into this portion 16 of the conduit will be vaporized by the effect of ambient temperature or added heat thereon. In the usual refrigeration plant having liquid ammonia in the tank 10, the horizontal portion 16 of conduit 15 should not be less than about eighteen inches in length. The conduit 15 includes an upwardly extending loop 17 which rises from the portion 16 to a level preferably but not necessarily above the normal liquid level 14 of the tank 10, and then extends to the top of an oil reservoir chamber or tank 18 which may be at any level and at any distance from the tank 10. A valve 13 is provided in the conduit 15. The entire conduit 15 including portions 16 and 17 should be uninsulated. Since only vaporized refrigerant is contained in the conduit 15, the conduit may be of small size pipe, such as conventional one-half inch pipe.

The oil reservoir 18 may be fabricated from a two-foot length of six inch pipe with welded heads, but the actual size is not important, and the reservoir should be large enough to contain a volume of liquid adequate to fill the gauge glass, float switch chambers and their immediate connecting conduits hereinafter described. The reservoir 18 is provided with an upwardly extending conduit 19 provided with a valve 20 adjacent the reservoir, the top of the conduit 19 being connected with the equalizing conduit 21 provided with a valve 22 and extending to the upper portion of tank 10. A conduit 23 is connected to the lower portion of the reservoir 18 and has an upwardly-extending portion 24 connected to the upper portion of conduit 19 between valves 20 and 22 by a conduit 25. A gauge glass 26 is connected to the conduit 24 at the upper and lower ends of the gauge by suitable connections which may be provided with the usual stop valves. A conduit 27 extends from the lower portion of conduit 24 to the float chamber 28 of a magnetically-operated switch 29, such as shown in Figure 3. The upper portion of the float chamber 28 is connected back into the upper portion of the conduit 24 by a connection 30.

The float switch 29, such as illustrated in Figure 3, is preferably of the closed type including a ball float 31 in the chamber 28, the float 31 having a projecting portion 32 provided with a permanent magnet 33 thereon. The magnet 33 is adapted to be moved up and down within the closed tubular portion 34 of the chamber 28. Outside of the tubular portion 34, which should be of a non-magnetic material such as brass, an electrical switch 35 is pivotally mounted. The switch 35 may be of the mercury tube type, and is provided with an operating arm 36 having a permanent magnet 37 thereon for actuation by movement of the magnet 33 carried by the float 31. The switch 35 may be connected by lines 38 to an electrically operated valve 39 in the liquid refrigerant feed line 40. A valved by-pass 41 may be provided around the valve 39. A suitable electric power supply may be connected to the control circuit at terminals 42.

The reservoir 18 is partially filled with a quantity of an indicating liquid 45, which liquid is immiscible with the refrigerant in the tank 10, and the indicating fluid may be ammonia oil, such as generally used in lubricating liquid ammonia pumps or the like.

The operation of the control system illustrated in Figure 1 will now be described. With the liquid ammonia level in receiver 10 being at 14, as illustrated, liquid ammonia 46 will tend to flow into the horizontal conduit 16. The conduit 16, being uninsulated, is sufficiently heated by ambient temperatures to vaporize any liquid ammonia therein, and the ammonia gas thus vaporized will bubble back into the receiver 10 and escape upwards through the liquid 45. In normal operation, the valve 13 remains open and ammonia gas in the conduit 15 has a pressure proportional to the static head of ammonia liquid in tank 10 between the conduit 16 and the liquid level 14. The pressure of the ammonia gas in conduit 15 is applied to the surface of the indicator oil 45 in reservoir 18. Valve 20 being normally closed, the indicator oil is forced into the vertically-extending conduit 24, into the gauge glass 26, and into the float switch chamber 28. The upper portion of the gauge 26 and the upper portion of the float chamber 28 being in communication with the upper portion of tank 10 through conduit 21 and the normally open valve 22, the level of the oil in the gauge 26 and in the float chamber 28 is thus controlled by the level 14 of the ammonia liquid in tank 10. If the liquid level 14 in tank 10 changes, the change will be immediately apparent by inspection of the gauge 26. A decrease in the liquid level 14 will cause a decrease in the oil level in the float chamber 28 causing the float 31 to lower itself and causing the permanent magnet 33 to actuate the magnet 37 of control arm 36, thereby closing the electrical circuit through switch 35. The switch 35 is connected to a power supply 42 and the magnetic liquid refrigerant feed valve 39 so that when switch 35 is closed, the valve 39 is opened to permit ammonia liquid to enter tank 10 through inlet 40. Automatic control of the liquid level in tank 10 is thus attained. When the liquid level 14 gets too high, the indicator oil 45 rises in gauge 26 and in float chamber 28 causing the switch 35 to open the control circuit, thereby causing valve 39 to be fully closed for automatically preventing the flow of more liquid refrigerant into the tank 10.

In the refrigerant control system illustrated in Figure 2, the arrangement and components are similar to those of Figure 1, except that two float switches 51 and 52, similar to float switch 29, are connected into the conduit 24 at upper and lower operating levels, and the two switches are connected in series to a relay 53 for controlling an ammonia pump 54. A power supply for the electrically-driven pump 54 is connected to the terminals 55 and the power supply for the float switch and relay circuit is connected to terminals 56. The Figure 2 control circuit provides the two float-operated switches 51 and 52 connected in series, so that when the indicator fluid level in conduit 24 and in the float chamber of switch 51 falls below the desired minimum level, the switch 51 is then automatically opened causing the relay 53 to be deenergized for opening the power supply circuit to stop the pump 54. As additional liquid ammonia returns into tank 10 through inlet 40, the indicator fluid level in conduit 24 rises until it enters the float chamber of upper switch 52 causing said upper switch to close, thereby energizing the relay 53 and causing the pump motor to be started. The lower float switch 51 is thus effective to stop the pump when the liquid level is too low, and the upper switch 52 is effective to start the pump when the liquid level is too high. Obviously, the float switches 51 and 52 may be mounted on the conduit 24 at proper spaced positions to automatically maintain a level of fluid in the tank 10, between desired limits, and by spacing them as shown in Figure 2, the level is automatically maintained within a range which avoids frequent starting and stopping of the pump 54.

When it is desired to check the zero indicator oil level in reservoir 18 and gauge 26, this may be done by closing valves 13 and 22 and opening valve 20. This permits the pressure of ammonia gas above the oil 45 in reservoir 18 to equalize with the pressure of ammonia gas over the indicator oil in gauge glass 26 and in the float switch chambers. If the oil level is found to be too low to read or below the zero level, additional oil may be added to the reservoir 18. To put either of the systems back in operation for automatic liquid level control, it is merely necessary to close valve 20 and then open valves 22 and 13.

It will be apparent from the above description and illustrative embodiments of this invention, that an automatic level control system is provided which is operated indirectly by gas pressure rather than by the low temperature liquid refrigerant. Frosting and/or freezing of indicator and control connections is avoided, and the indicator and control switches may be placed at any remote location which may be convenient. Balancing and calibration of the indicator may be quickly and easily accomplished by manipulation of the three hand valves described. The systems disclosed may be easily assembled and connected to refrigeration system tanks or receivers already installed.

This invention contemplates the use of various other forms of indicating devices, control switches, indicator fluids, and valve arrangements, as it will be readily apparent to the skilled refrigeration mechanic that such variations are possible within the scope of the following claim.

What I claim is:

In refrigeration apparatus, automatic means for controlling the liquid level of a vaporizable low-temperature-liquid refrigerant in a tank, said means comprising in combination: a conduit extending outward from the lower portion of said tank and exposed to ambient temperatures; a closed chamber spaced from said tank and containing a liquid immiscible with said refrigerant; a second conduit connecting said first conduit with the upper portion of said closed chamber; a vertically-extending conduit having its lower end in communication with the lower portion of said chamber and having its upper portion in communication with the upper portion of said tank, a pair of spaced float chambers in communication with said vertically-extending conduit; a float in each of said float chambers, an electrical switch for and operable by each of said floats; a pump for removing liquid refrigerant from said tank; and a relay switch for controlling the power supplied to drive said pump, said relay switch being connected to said float-operated switches whereby the closure of both of said float switches starts said pump and the opening of the lower of said float switches stops said pump.

VELT COWAN PATTERSON.

REFERENCES CITED

The following references are of record in the file of this patent:

UNITED STATES PATENTS

| Number | Name | Date |
|---|---|---|
| 1,805,901 | Bergdoll | May 19, 1931 |
| 1,819,861 | Bergdoll | Aug. 18, 1931 |
| 1,829,517 | Hilger | Oct. 27, 1931 |
| 1,929,523 | Shrode | Oct. 10, 1933 |